Figure 1:
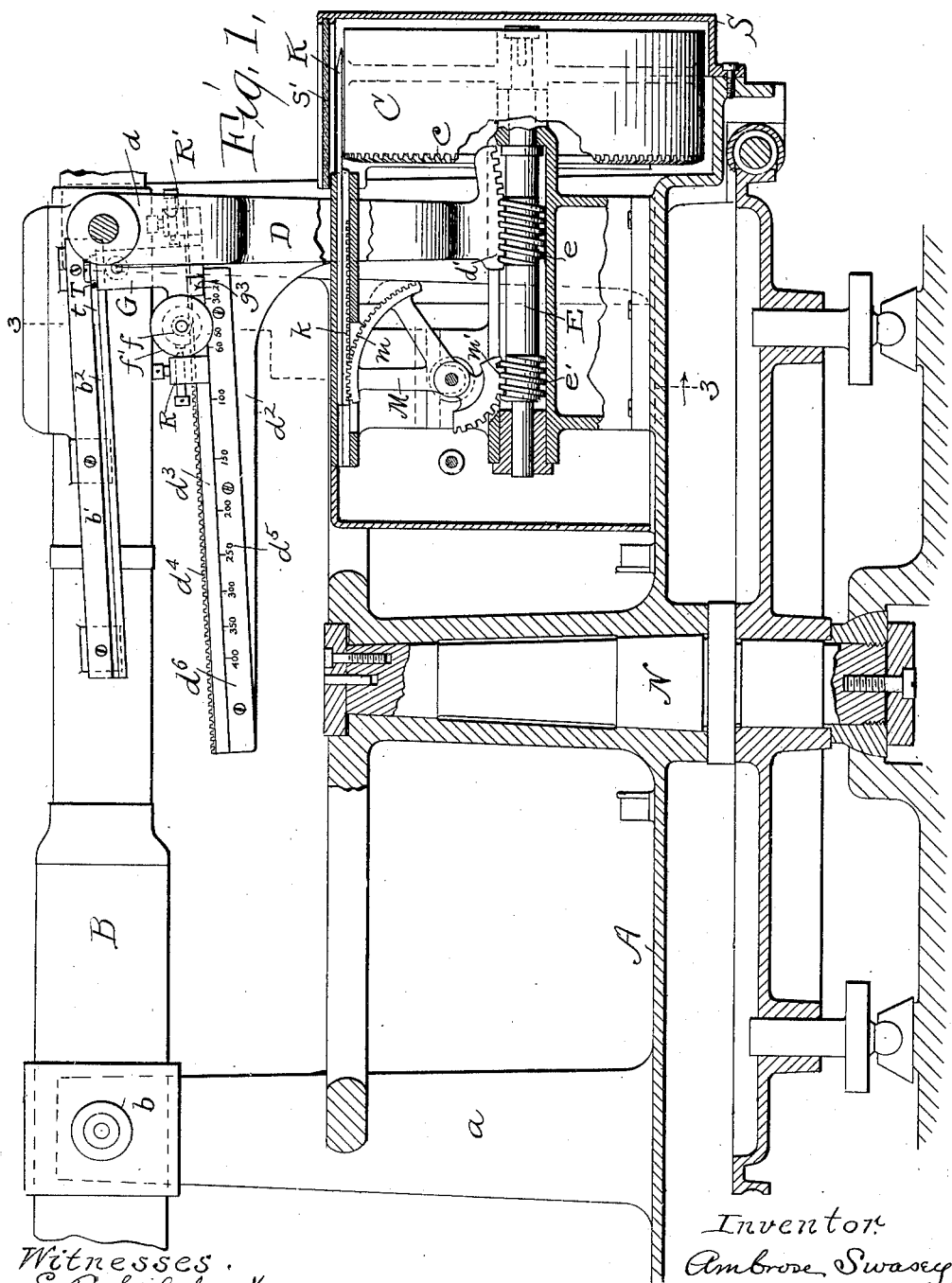

No. 737,794. PATENTED SEPT. 1, 1903.
A. SWASEY.
DEPRESSION RANGE FINDER.
APPLICATION FILED SEPT. 4, 1902.
NO MODEL. 3 SHEETS—SHEET 3.

Witnesses.
E. B. Gilchrist
H. M. Wise.

Inventor.
Ambrose Swasey,
By his Attorneys,
Thurston & Bates

No. 737,794. Patented September 1, 1903.

UNITED STATES PATENT OFFICE.

AMBROSE SWASEY, OF CLEVELAND, OHIO, ASSIGNOR TO THE WARNER & SWASEY COMPANY, OF CLEVELAND, OHIO, A CORPORATION OF OHIO.

DEPRESSION RANGE-FINDER.

SPECIFICATION forming part of Letters Patent No. 737,794, dated September 1, 1903.

Application filed September 4, 1902. Serial No. 122,047. (No model.)

*To all whom it may concern:*

Be it known that I, AMBROSE SWASEY, a citizen of the United States, residing at Cleveland, in the county of Cuyahoga and State of Ohio, have invented a certain new and useful Improvement in Depression Range-Finders, of which the following is a full, clear, and exact description, reference being had to the accompanying drawings.

The invention relates to improvements in depression range-finders, which are instruments having tilting telescopes which move in a vertical plane about a horizontal axis. These instruments are provided with indicators which constantly present to the observer the solution of the varying problems of triangulation that are incident to the various angular positions which the telescope may occupy. In using these instruments they must be fixed at a known elevation. The elevation of the telescope above this plane is the known base-line of the triangle, which base-line makes a right angle to the horizontal line whose length is to be ascertained. The angle of depression of the telescope when directed at an object whose distance from the foot of the base-line is to be determined gives the data from which to calculate the horizontal distance between the foot of the vertical base-line and the point where the horizontal line intersects the axial line of the telescope.

The objects of this invention are, first, to obtain accuracy in the operations and indications of the instrument, and, second, to adapt the instrument for use at any desired elevation above the horizontal plane in which the distances are to be measured. This horizontal plane is commonly the sea-level. These instruments are designed especially for use in the coast-defense service to ascertain the distance from the foot of the vertical base-line to any object—for example, a hostile ship floating upon the surface of the water.

The invention consists, first, in the mechanism intermediate of the telescope and indicating device whereby the telescope and indicator simultaneously move properly correlated distances adapted to the elevation of the instrument; second, in the means of adjusting this intermediate mechanism for any desired altitude of the instrument, so that the angular movement of the instrument will be accompanied by a properly-proportioned movement of the indicator; third, generally in the combination of parts having to do with these movements and their proper correlation, and, fourth, in the indicator mechanism—all of which are shown in the drawings and will now be described, and definitely pointed out in the claims.

Figure 2:
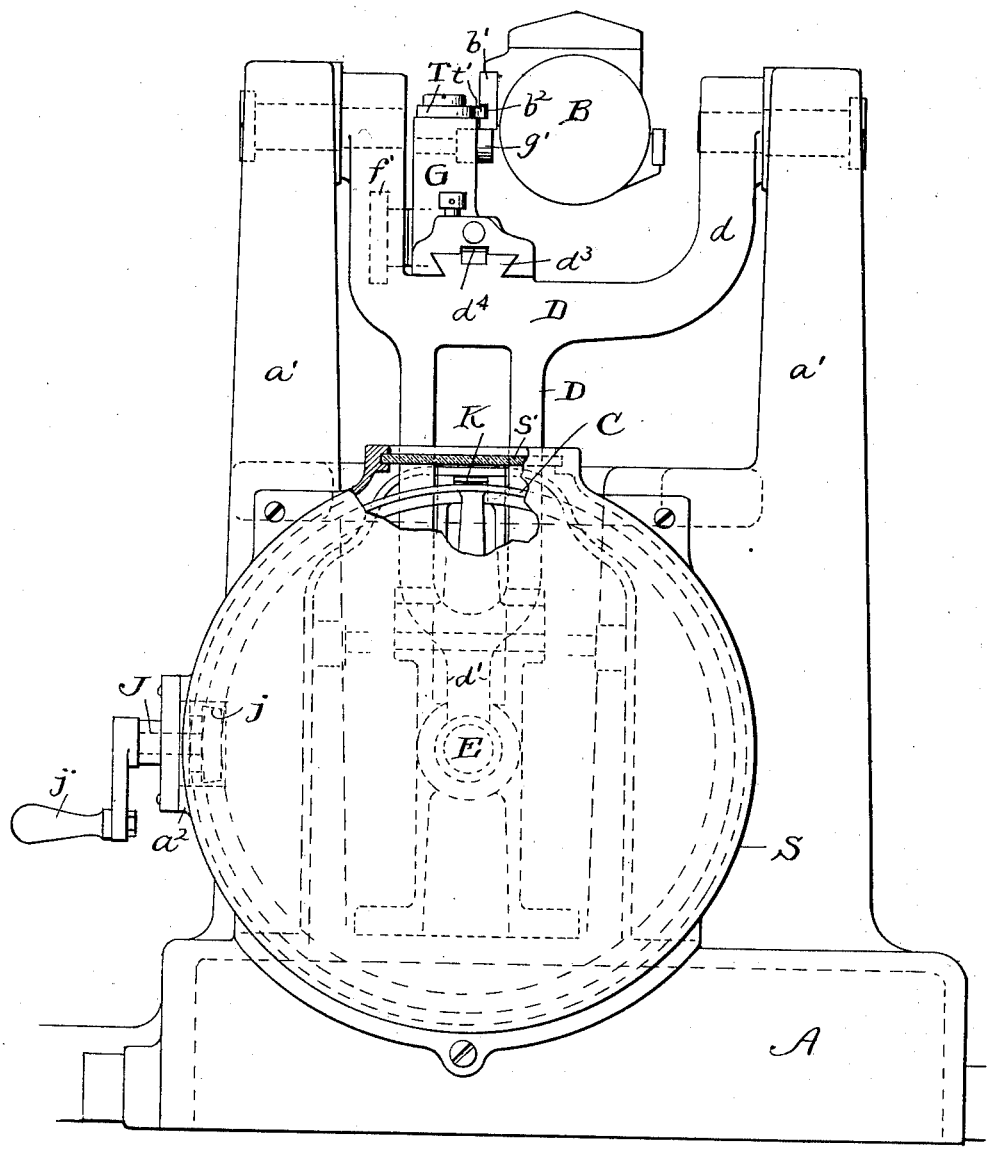
Figure 3:
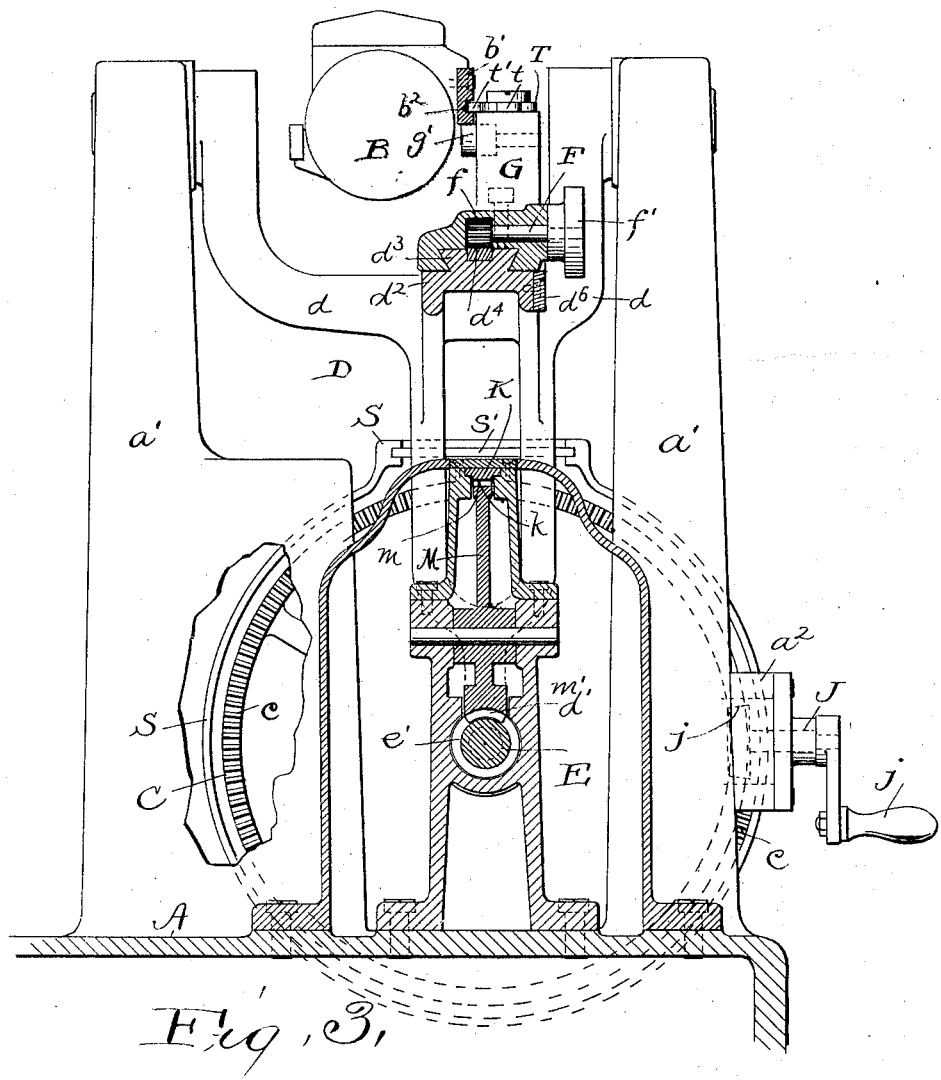
Figure 4:
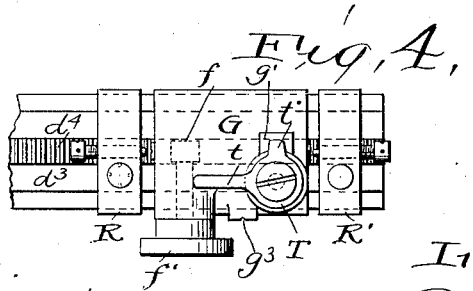

In the drawings, Figure 1 is a side elevation, partly in section, of so much of the instrument as is necessary to show the elevation. Fig. 2 is a front view of the instrument or so much thereof as discloses the present invention. Fig. 3 is a sectional front view in the plane indicated by line 3 3 of Fig. 1. Fig. 4 is a plan view of the horizontal arm of a lever forming a part of the mechanism intermediate of the telescope and indicator and of the adjustable mechanism carried upon said arm for engagement with the telescope.

The instrument shown is an azimuth instrument and includes a supporting-frame A, rotatable about a true vertical axis, as the spindle N, and all of the mechanism constituting the present invention is mounted and supported upon this frame. In every instrument of this class means are provided for measuring and ascertaining the angular movement of this supporting-frame; but such mechanism forms no part of the present invention, and is therefore not described nor completely shown. The present invention is not, however, limited to an azimuth instrument.

*a a* represent standards, only one being shown, rising from the frame A. The telescope B occupies a position between these standards and has laterally-extended trunnions *b*, which are mounted in true horizontal bearings upon said standards. Near the eyepiece end of the instrument are two other vertical standards *a′ a′*, which rise from the frame and between which the telescope passes. Lying between these standards and pivoted thereto on an axis which is parallel with the axis upon which the telescope turns is a lever D, whose upper end is forked, the two forks *d d*, which lie on opposite sides of the telescope, being the parts of the lever by which it is pivoted to said standards, as stated. On the lower end of the lever is a worm-segment $d'$, which engages with a worm-screw on a shaft E. This shaft is suitably mounted and has secured to the end which is nearest the operator a graduated cylinder C, which serves as the distance-indicator.

The lever D is provided with an arm $d^2$, which extends toward the horizontal axis of the telescope. This arm $d^2$ has on its upper edge preferably a dovetail tongue $d^3$, which fits into a dovetail groove in a sliding block G, supported on said arm. A rack $d^4$ is let into the top face of this arm, and a pinion $f$ attached to a shaft F, mounted in said block, engages with this rack. Turning this shaft by means of a wheel $f'$ on its end moves the block along this arm toward or from the axis of the lever D. One side of this arm $d^2$ is graduated, as shown at $d^5$, the graduations being preferably upon a bar $d^6$, secured to the side of the arm $d^2$, and upon the corresponding side of the movable block is a pointer $g^3$ for reading the said graduations.

On the side of the telescope is a flange $b$ which is preferably a bar attached to the side of the telescope. The sliding block G carries a stud $g'$, which extends under and engages with the lower edge of the bar or flange $b'$. Therefore by the turning of the shaft E the lever D will be rocked through the described connection between them. By reason of the described engagement of the pivot-pin $g'$ with the bar $b'$ there will be a concurrent tilting of the telescope; but the extent of the tilting of the telescope will depend upon the point on the bar $b'$ with which the pivot-pin engages. The sliding of block G along the arm $d^2$ toward its outer end lengthens the lever-arm wherewith the lever D tilts the telescope, and it also shortened the distance between the pivot of the telescope and the point at which the pressure is applied to tilt it. It is evident, therefore, that for a given movement of the indicator the tilting motion of a telescope in a vertical plane will be reduced as the sliding block is moved toward the pivot of the lever D. The graduations on this lever-arm $d^2$ have been carefully calculated and accurately placed, so that whatever may be the altitude of the instrument, if the sliding block is moved to a position where its index-mark registers with the index-mark on the bar corresponding with the altitude, all of the angular movements of the telescope will thereafter be accompanied by a properly-correlated movement of the indicater whereby the latter will indicate the actual length of the horizontal member of the right-angle triangle of which the said altitude is the known base. In other words, it will indicate the horizontal distance from the object sighted to the foot of the vertical base-line in which the instrument is placed.

In order to tilt the telescope and produce the properly-correlated movements of the associated parts, a crank-shaft J is mounted in something fixed to the frame A, preferably in a block $a^2$, secured to the side of one of the vertical standards $a'$. This crank-shaft has on its inner end a beveled gear $j$, meshing with the beveled gear-teeth $c$ on the inner edge of the indicator-cylinder C. By turning this crank-shaft by means of a handle $j'$ all of the parts constituting the train of mechanism described are moved, including the telescope. Any form of indicator device may be used with the described mechanism for tilting the telescope. The indicator shown consists of a range-cylinder C, attached to the shaft E, and on its periphery is a spiral line, either actual or imaginary, along which are placed the figures which represent the number of units of distance which the object sighted is from the foot of the vertical base-line, these figures and their proper positions upon the indicator-cylinder having been carefully determined. This spiral disposition of these indicating-graduations has the advantage of giving a large indicator in small compass; but there is necessarily associated with it a movable pointer K to indicate which one of the spiral rows of graduations must be read. This pointer is a bar K, sliding in suitable ways above and parallel with the shaft E, and adapted to project over the cylinder C. It has on its under side rack-teeth $k$, which engage in a gear-segment $m$, constituting one end of a rocker M, which is pivoted on a horizontal pivot between the said indicator-bar and the shaft E, and this rocker has on the opposite side of its pivot worm-teeth, $m'$ which engage with a worm-screw $e'$ on the shaft E. The rotation of the shaft and its attached indicator-cylinder is necessarily accompanied by a movement of this pointer, and the described parts are so proportioned that the end of the pointer advances in accordance with the pitch of the spiral graduations, wherefore it always points to the proper graduation to be read.

The described instrument may be placed, as above stated, at any elevation above the sea-level, and when once placed and its altitude is ascertained the sliding block is moved along the arm $d^2$ to the proper point thereof, as indicated by the graduations, for the instrument to work properly at said altitude. If the instrument is located at tide-water, the adjustment of the block must be varied during the day in accordance with the rise and fall of the tide, and to facilitate this adjustment two adjustable stops R R' are secured to the arm $d^2$ on opposite sides of the sliding block G, and so placed that when the block engages with one of them the instrument is properly set for the high-water level and when it engages with the other it is properly set for the low-water level. With these stops there is no danger that the adjustment of the instrument will be materially wrong at any time, since it is possible to have the adjustment incorrect only within very small limits.

On top of the sliding block is a safety-lever T. It is pivoted on a vertical axis and has an operating-arm $t$ and a finger $t'$, which enters and fits loosely in a slot $b^2$ in the bar $b'$ on the side of the telescope. The weight of the telescope is so disposed on opposite sides of its pivot that its eyepiece will always by gravity rest upon the operating pin $g$ carried by the sliding block G. This safety-lever is to prevent the accidental lifting of the telescope from this pin and the possible resultant dropping of the same onto the pin $g$, which might bend or break something and thereby render the device either inoperative or inaccurate. The shaft E, the sliding pointer K, the indicator-cylinder C, the device intermediate of the shaft and pointer, and some other mechanism, as shown, are in a case S, which is provided with a transparent window $s'$ in its top side above the cylindrical indicator.

Many changes may be made in the construction and combination of parts differing from those suggested without departing from the essential characteristics of this invention.

Having described my invention, I claim—

1. In a depression range-finder, the combination of a telescope tilting in a vertical plane on a horizontal transverse axis, with a lever independently pivoted on a fixed transverse axis parallel with the horizontal transverse axis of the telescope and adapted to tilt the telescope, with a range-indicator, and mechanism for simultaneously moving the indicator and lever, substantially as described.

2. In a depression range-finder, the combination of a telescope tilting in a vertical plane on a horizontal transverse axis, and a lever independently pivoted on a fixed transverse axis parallel with the horizontal transverse axis of the telescope and adapted to tilt the telescope, with a range-indicator, mechanism for simultaneously moving the indicator and the lever, and an adjustable connection between the lever and telescope whereby a given angular movement of the lever will produce different angular movements of the telescope, substantially as described.

3. The combination of a telescope tilting in a vertical plane on a horizontal transverse axis, a lever pivoted on a fixed transverse axis parallel with the horizontal transverse axis of the telescope, and having an approximately horizontal arm, with a block adjustable upon said arm, means carried by this block for engaging with the telescope to tilt it, a range-indicator, and mechanism for simultaneously moving said lever and indicator, substantially as specified.

4. In a depression range-finder, the combination of a telescope tilting in a vertical plane on a horizontal transverse axis, a lever pivoted on a fixed transverse axis parallel with the horizontal transverse axis of the telescope, and having an arm which extends toward the transverse axis of the telescope and is graduated to indicate various altitudes at which the instrument may be placed, a block adjustable upon said arm, means carried by this block for engaging with the telescope to tilt it, a range-indicator graduated to indicate horizontal distances, and mechanism for simultaneously moving the indicator and lever, substantially as specified.

5. In a depression range-finder, the combination of a tilting telescope, an operating-lever mounted on an axis parallel to the telescope-axis, a range-indicator cylinder having spirally-placed graduations on its periphery, and mechanism for simultaneously moving said lever and indicator-cylinder, with a sliding pointer, and means whereby it is moved in a path parallel to the axis of the cylinder, and at a speed which causes its end to follow the spiral corresponding with the pitch of the spiral graduations, substantially as specified.

6. In a depression range-finder, the combination of a tilting telescope, and an operating-lever pivoted on an axis parallel to the telescope-axis, and provided with one arm which extends toward the axis of the telescope and tilts the telescope, and a second arm which extends downwardly and has a worm-segment on its lower end, with a worm-shaft which engages with the worm-segment, and a range-indicator operating said shaft, substantially as specified.

7. In a depression range-finder, the combination of a tilting telescope, and an operating-lever pivoted on a parallel axis and provided with a downwardly-extending arm having a worm-segment on its lower end, and an approximately horizontal arm graduated to indicate various altitudes, a sliding block which is mounted on the last-named lever-arm and which engages with the telescope to tilt it, a pin carried by said block, a flange on the telescope with whose lower edge said pin engages, a worm-shaft which engages with the worm-segment on said lever, and a range-indicator device which operates with said shaft, substantially as specified.

8. In a depression range-finder, the combination of a tilting telescope, a lever pivoted on a parallel axis and having an arm extending toward the axis of the telescope and graduated to represent altitudes, with a block slidable upon said arm, a pivot-pin carried by said block, and a flange on the telescope with whose lower edge said pivot-pin engages to operate it, said lever also having downwardly-extending arm with a worm-segment on its lower end, a worm-shaft which engages with the worm-segment and operates the lever, a range-indicator cylinder secured to said shaft, and having on its periphery spirally-placed graduations, a pointer movable over the face of said cylinder in a path parallel with its axis, rack-teeth on the lower side of said pointer, and a pivoted rocker having a gear-segment on one side of its axis which engages with said rack-teeth, and a worm-segment on the other side of said axis, and a worm on said shaft for engaging with the last-named worm-teeth, substantially as specified.

9. The combination of a tilting telescope, a lever pivoted on a parallel axis to a fixed support, a range-indicator, and means for simultaneously moving the indicator and lever, said lever having a graduated arm, a block movable upon said graduated arm, mechanism carried by said block for engaging with the telescope to operate it, and two adjustable stops located at opposite ends of said movable block, substantially as specified.

10. The combination of a tilting telescope having a longitudinally-extended flange and slot, a lever pivoted on a parallel axis to a fixed support, a range-indicator and means for simultaneously moving the indicator and lever, with a block slidably mounted on said lever, a pin secured to said block and engaging the lower edge of said flange, and a safety-latch also mounted on the block and engaging in said slot, substantially as specified.

11. In a depression range-finder, the combination of a telescope tilting in a vertical plane on a horizontal transverse axis, an operating-lever pivoted on an axis which is parallel to the horizontal transverse axis of the telescope, a range-indicator, mechanism connecting said indicator with one arm of said lever whereby the movement of one results in the simultaneous proportionate movement of the other, and a device adjustable upon the other arm of said lever and engaging with the telescope whereby the rocking of the lever causes the tilting of the telescope on its said transverse axis, substantially as specified.

In testimony whereof I hereunto affix my signature in the presence of two witnesses.

AMBROSE SWASEY.

Witnesses:
JOHN WEBER,
H. L. UMSTEAD.